United States Patent [19]

Currie

[11] 4,156,540
[45] May 29, 1979

[54] SEALANT FOR HOSE FITTINGS
[75] Inventor: William E. Currie, Cleveland Heights, Ohio
[73] Assignee: Parker-Hannifin Corporation, Cleveland, Ohio
[21] Appl. No.: 829,166
[22] Filed: Aug. 30, 1977
[51] Int. Cl.² ............................................. F16L 21/00
[52] U.S. Cl. .................................... 285/94; 285/251; 285/423; 285/DIG. 26
[58] Field of Search ............... 285/200, 251, DIG. 26, 285/94, 149, 256, 423, 259, 21; 138/109; 156/83, 294, 308; 428/36

[56] References Cited

U.S. PATENT DOCUMENTS

| | | | |
|---|---|---|---|
| 2,925,624 | 2/1960 | Stahl et al. | 156/294 X |
| 3,117,903 | 1/1964 | Hix | 156/308 X |
| 3,177,016 | 4/1965 | Holmgren | 285/251 X |
| 3,246,921 | 4/1966 | Lyon et al. | 285/251 X |
| 3,361,589 | 1/1968 | Lindsey | 156/308 X |
| 3,540,486 | 11/1970 | Flounders | 285/256 |
| 3,966,238 | 6/1976 | Washkewicz | 285/259 X |

FOREIGN PATENT DOCUMENTS 673527 11/1963 Canada ........................ 285/DIG. 26
1349517 4/1974 United Kingdom ..................... 285/200

Primary Examiner—Dave W. Arola
Attorney, Agent, or Firm—John N. Wolfram

[57] ABSTRACT

A means for ensuring a firm seal between a hose fitting and a hose comprising a sealant that also acts as a lubricant and is applied to the nipple portion of the fitting prior to insertion into the core tube of the hose. The sealant causes the core tube or the core tube liner, if used, to soften and swell, thereby completely filling and firmly engaging the threads in the nipple portion, and also causes a localized plasticized condition in the core tube or liner adjacent the threaded portion of the nipple resulting in the core tube retaining firm engagement with the nipple during temperature cycling and flexing of the hose assembly.

9 Claims, 3 Drawing Figures

SEALANT FOR HOSE FITTINGS

BACKGROUND OF THE INVENTION

1. Field of the Invention

This invention relates to means for sealing hose fittings and more particularly to means which lubricate and seal fittings to hoses carrying gases which are difficult to seal.

2. Description of the Prior Art

It has been found that certain gases and vapors, such as hydrogen, helium, fuel gas, and various halogenated refrigerants sometimes known by the trademark "Freon", are difficult to convey through hoses without substantial loss since they have a strong tendency to permeate through the wall of the hose. This is particularly true of hoses having synthetic rubber core tubes. This problem of leakage through the hose wall itself is largely overcome by core tubes made of a thermoplastic material which has a much greater sealing ability than synthetic rubber. The use of a thermoplastic for the core tube may create another problem when the hose is connected to reusable screw-together fittings since the relatively unyielding core tube material tends to incompletely fill the nipple threads in the fitting leaving a minute but continuous helical leakage path between the nipple and the core tube. Because of this, in a thermoplastic hose assembly practically all of the advantage of better sealing ability of the hose wall is lost due to leakage at the fittings.

A possible solution to this problem of leakage at the fittings is to eliminate the threaded connection by using permanently attached fittings having annular grooves creating leakage barriers at the points of contact between the nipple and the core tube. Such an approach, however, prevents the fittings from being attached without special tooling or being reused. Alternatively, a heavy bodied sealant might be used. The sealant, however, tends to lose its effectiveness after flexing or temperature cycling, and from reduction or elimination of the compression upon the sealant.

Because hoses having thermoplastic core tubes are so very effective in preventing the passage of gas through their walls, but so much less effective in forming a good seal between the core tube and a screw-together reusable fitting, it has become desirable to develop a means for securing the fitting to the thermoplastic core tube to prevent leakage therebetween while allowing the fitting to be reused.

SUMMARY OF THE INVENTION

The present invention provides a solution to the problem of leakage between the nipple of a screw-together reusable fitting and a thermoplastic core tube. This is accomplished by the application of a particular type of sealant to the nipple threads prior to insertion of the nipple into the hose core tube. The sealant acts as a lubricant during assembly and causes the core tube or core tube liner, if used, to soften and swell so as to completely fill the nipple threads, and creates a localized plasticized condition in the core tube or liner so that the core tube will follow the nipple through temperature cycling and/or flexing to preserve the seal between the core tube and the nipple.

DESCRIPTION OF THE PREFERRED EMBODIMENT

Figure 1:
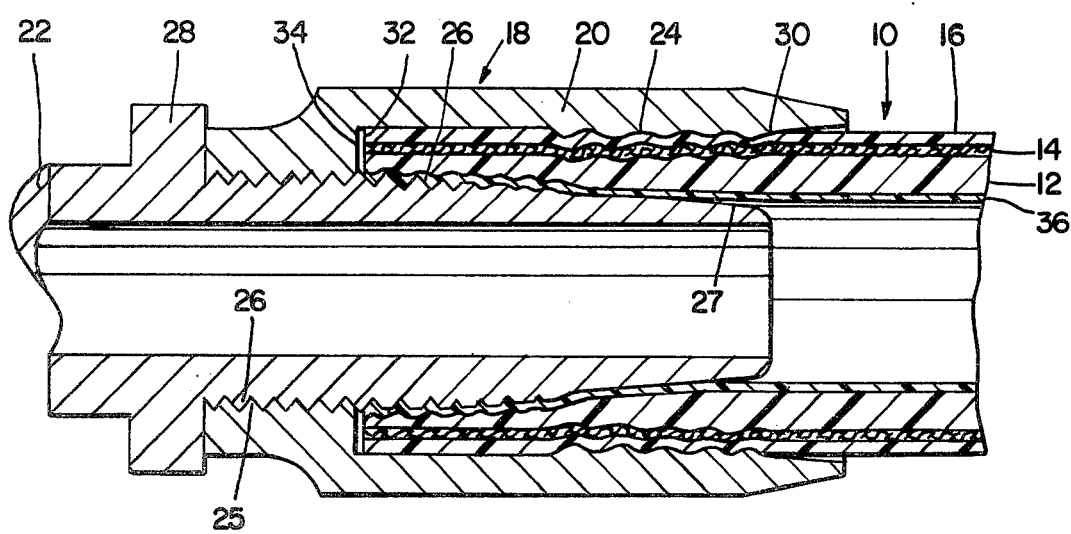
FIG. 1 is a cross-sectional view illustrating a typical connection between a hose with a thermoplastic core tube and screw-together reusable fitting.

Referring now to the drawings, FIG. 1 illustrates a hose 10 having a core tube 12, a reinforcement layer 14, and an outer sheath 16. A core tube liner 36 is optional depending upon the material selected for the core tube 12. Typically, core tube 12 is of a thermoplastic material such as nylon, however, it may also be of synthetic rubber in which case core tube liner 36 is required and would be of a thermoplastic material. Reinforcement layer 14 is usually formed of a fibrous material, such as nylon, rayon, or dacron, however, it may be steel wire. Outer sheath 16 may be formed from either a thermoplastic material, a fibrous material, or synthetic rubber. Fitting 18 is comprised of a socket 20 and a nipple 22 which is received therein. Typically socket 20 has left hand threads 24 and right hand threads 25 formed on the inner surface thereof while nipple 22 has right hand threads 26 formed on the outer surface thereof which mate with threads 25 on socket 20, and an inwardly tapered portion 27 also formed on the outer surface thereof. Nipple 22 may have a hexagonal portion 28 located adjacent threads 26 and oppositely disposed from tapered portion 27.

Figure 2:
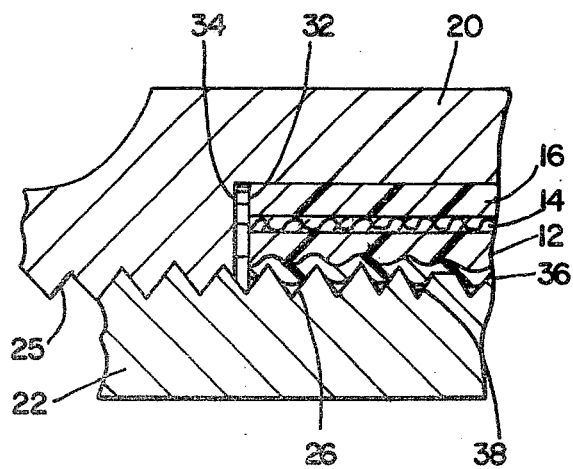
FIG. 2 is an enlarged fragmentary cross-sectional view illustrating the incomplete filling of the nipple threads by the core tube.

For assembly, hose 10 is inserted into socket 20 so that the leading edge 30 of threads 24 comes into contact with outer sheath 16. Hose 10 is then turned counterclockwise into socket 20 until end 32 on hose 10 comes into contact with shoulder 34 formed in the interior of socket 20. Hose 10 may then be turned approximately one-half (½) turn clockwise to creat a small clearance between hose end 32 and shoulder 34. Nipple 22 is then inserted into end 32 of hose 10 and turned clockwise until portions of threads 26 engage the core tube liner 36, if used, or core tube 12. Due to the nature of the material of the core tube and the liner, viz. nylon, the material does not completely fill the nipple thread form leaving gaps 38, as shown in FIG. 2, at the root of the thread form resulting in a minute but continuous helical leakage path for the gas being communicated through the hose assembly. This leakage is lessened by the sealing effect obtained by contact of core tube 12 or core tube liner 36 with part of the tapered portion 27 of the nipple 22. However, in practice it is observed that extrusion lines and other imperfections on the inside surface of cure tube 12 or core tube liner 36 will permit substantial leakage of highly permeative gases, no matter how firm the contact with tapered portion 27.

Figure 3:
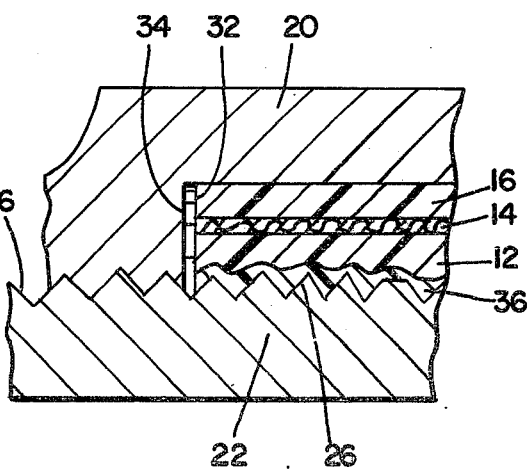
FIG. 3 is an enlarged fragmentary cross-sectional view illustrating the complete filling of the nipple threads by the core tube when a sealant made in accordance with the present invention is used.

In FIG. 3, this problem of leakage is overcome by the elimination of the helical leakage path. This is accomplished by the application of a sealant, which also acts as a lubricant, to the nipple 22 before it is inserted and turned into the core tube 12 or liner 36. The composition of the sealant is such that it causes the core tube or liner to soften and swell filling the entire thread form thus eliminating the helical leakage path. In addition, the sealant causes a localized plasticized condition in the core tube or liner resulting in the core tube following the nipple through temperature cycling and flexing so as to preserve the seal between the core tube and the nipple. A sealant and lubricant ideally suited for this application is "Unipar", a material available from Parker-Hannifin Corporation. "Unipar" contains castor oil and sodium hydroxide, in addition to various lubricating and sealing materials, and is usually used for lubricating and sealing tapered pipe thread joints. The lubricating properties of this composition make "Unipar" an ideal lubricant for the insertion of the nipple into the core tube, whereas the sodium hydroxide and the castor oil provide the seal therebetween. The sodium hydroxide softens the core tube or the core tube liner and causes it to swell and fill the entire thread form on the nipple eliminating the helical leakage path and forming a firm seal between the nipple and the core tube. The castor oil is absorbed slightly into the swollen core tube or liner creating a localized plasticized condition in the vicinity of the threads. This plasticized condition causes the core tube to follow the nipple through temperature cycling and/or flexing of the hose assembly while preserving the seal between the nipple and the core tube. The combined effect of the swollen core tube or liner completely filling the nipple threads and the localized plasticizing of the core tube or liner in the vicinity of the threads creates a seal between the core tube and the nipple which prevents leakage therebetween and which remains intact through cycles of temperature and flexing of the hose assembly.

Variations of the present invention will be apparent to those having ordinary skill in the art and the invention is limited only by the spirit and scope of the following claims:

I claim:

1. In a connection between a hose fitting and a hose, said fitting comprising a socket and a nipple received in said socket defining a chamber therebetween; said nipple having threads over a portion of the length thereof, said hose having an end portion received in said chamber firmly engaging said socket and engaging said threaded portion, and means applied only to the inner surface of said hose for softening and swelling the inner surface of said end portion of said hose relative to the remainder of said hose as to completely fill and firmly engage said threaded portion of said nipple.

2. In a hose connection as defined in claim 1, wherein said hose is comprised of a core tube and an outer sheath about said core tube, the inner surface of said core tube being softened to completely fill said threaded portion.

3. In a hose connection as defined in claim 1, wherein said hose is comprised of a core tube liner, a core tube about said core tube liner and being of a material different than said core tube liner, and an outer sheath about said core tube, the inner surface of said core tube liner being softened to completely fill said threaded portion.

4. In a hose connection as defined in claim 1 wherein said softening means creates a plasticized condition in the inner surface of said end portion of said hose adjacent said nipple threads causing said inner surface to retain said firm engagement with said nipple threads during temperature cycling and flexing of said hose connection.

5. In a hose connection as defined in claim 1 wherein said softening means lubricates said nipple easing the insertion of said nipple into said hose.

6. In a hose connection as defined in claim 1 wherein said softening means contains sodium hydroxide causing the inner surface of said end portion of said hose to soften and swell completely filling said threaded portion of said nipple.

7. In a hose connection as defined in claim 1 wherein said softening means contains castor oil causing a plasticized condition in the inner surface of said hose resulting in said inner surface firmly engaging said nipple during temperature cycling and flexing of said hose connection.

8. In a connection between a hose fitting and a hose, said fitting comprising a socket and a nipple received in said socket defining a chamber therebetween, said nipple having threads over a portion of the length thereof, said hose having an end portion received in said chamber and engaging said threaded portion, and means for softening the inner surface of said end portion of said hose relative to the remainder of said hose so as to cause swelling of said end portion and to cause said hose to completely fill and firmly engage said threaded portion of said nipple, said softening means having been applied by way of said threaded portion of said nipple so as to limit swelling to the inner surface of said end portion of said hose.

9. In a hose connection as defined in claim 8 wherein said softening means is sodium hydroxide and is applied as a sealant, further including castor oil as a plasticizer for the inner surface of said hose and a lubricant for easing the insertion of said nipple into said hose.

* * * * *